United States Patent
Schultheiss et al.

(10) Patent No.: US 11,099,050 B2
(45) Date of Patent: Aug. 24, 2021

(54) WAVEGUIDE COUPLING FOR A FILL LEVEL RADAR

(71) Applicant: VEGA GRIESHABER KG, Wolfach (DE)

(72) Inventors: Daniel Schultheiss, Hornberg (DE); Christoph Mueller, Oppenau (DE); Roland Baur, Koenigsfeld (DE)

(73) Assignee: VEGA GRIESHABER KG, Wolfach (DE)

(*) Notice: Subject to any disclaimer, the term of this patent is extended or adjusted under 35 U.S.C. 154(b) by 0 days.

(21) Appl. No.: 16/115,065

(22) Filed: Aug. 28, 2018

(65) Prior Publication Data
US 2019/0063983 A1    Feb. 28, 2019

(30) Foreign Application Priority Data
Aug. 28, 2017 (EP) .................... 17188089

(51) Int. Cl.
| | | |
|---|---|---|
| *G01F 23/284* | (2006.01) | |
| *G01S 13/88* | (2006.01) | |
| *H01Q 1/22* | (2006.01) | |
| *G01S 7/03* | (2006.01) | |
| *H01P 5/08* | (2006.01) | |
| *H01Q 13/02* | (2006.01) | |
| *H01P 5/107* | (2006.01) | |
| *G01S 13/00* | (2006.01) | |

(52) U.S. Cl.
CPC ............. *G01F 23/284* (2013.01); *G01S 7/03* (2013.01); *G01S 13/88* (2013.01); *H01P 5/08* (2013.01); *H01Q 1/225* (2013.01); *H01Q 13/02* (2013.01); *H01Q 1/2283* (2013.01)

(58) Field of Classification Search
CPC ......... G01S 7/034; H01Q 1/247; H01P 3/121; H01P 5/107; H01S 3/0632; H03B 9/145
See application file for complete search history.

(56) References Cited

U.S. PATENT DOCUMENTS

| | | | | |
|---|---|---|---|---|
| 2,695,356 A | * | 11/1954 | Sunstein | ................ G01S 7/034 455/302 |
| 3,462,713 A | * | 8/1969 | Knerr | ..................... H01P 5/107 333/21 R |
| 3,778,717 A | | 12/1973 | Okoshi et al. | |

(Continued)

FOREIGN PATENT DOCUMENTS

| | | |
|---|---|---|
| CN | 101305495 A | 11/2008 |
| CN | 105470612 A | 4/2016 |

(Continued)

OTHER PUBLICATIONS

Axel Tessmann, "Terahertz Circuits and Modules", https://www.iaf.fraunhofer.de/content/dam/iaf/documents/ausz%C3%BCge-jahresberichte/14_jb_gf1_artikel-2.pdf, 2013, pp. 38-41.

(Continued)

*Primary Examiner* — Bernarr E Gregory
(74) *Attorney, Agent, or Firm* — Oblon, McClelland, Maier & Neustadt, L.L.P.

(57) ABSTRACT

A waveguide coupling for a fill level radar including a waveguide and a high-frequency chip, which projects at least in part into the waveguide and includes a coupling element for coupling the transmission signal into the waveguide.

9 Claims, 2 Drawing Sheets

(56) References Cited

U.S. PATENT DOCUMENTS

| | | | | |
|---|---|---|---|---|
| 3,866,144 | A | * | 2/1975 | Sawayama ............ H03B 9/145 331/107 G |
| 4,453,142 | A | * | 6/1984 | Murphy ................. H01P 5/107 333/26 |
| 4,608,713 | A | * | 8/1986 | Shiomi .................. H01Q 1/247 333/21 R |
| 4,716,386 | A | * | 12/1987 | Lait ........................ H01P 5/107 333/26 |
| 6,401,532 | B2 | * | 6/2002 | Lubbers ............... G01F 23/284 324/637 |
| 6,549,174 | B2 | * | 4/2003 | Kloefer ................ G01F 23/284 343/771 |
| 7,322,233 | B2 | * | 1/2008 | Fehrenbach ......... G01F 23/284 73/290 R |
| 7,752,911 | B2 | * | 7/2010 | Schultheiss .......... G01F 23/284 333/26 |
| 9,683,882 | B2 | | 6/2017 | Gerding et al. |
| 10,468,736 | B2 | * | 11/2019 | Mangaiahgari ......... H01P 3/121 |
| 2004/0046573 | A1 | * | 3/2004 | Schroth ................ G01F 23/284 324/644 |
| 2004/0056667 | A1 | | 3/2004 | Lutke et al. |
| 2007/0133083 | A1 | * | 6/2007 | Kangaslahti .......... H01S 3/0632 359/337 |
| 2010/0103024 | A1 | | 4/2010 | Schultheiss et al. |
| 2017/0093011 | A1 | | 3/2017 | Cook et al. |
| 2018/0259384 | A1 | | 9/2018 | Baur et al. |

FOREIGN PATENT DOCUMENTS

| | | |
|---|---|---|
| DE | 10 2014 109 120 A1 | 12/2015 |
| DE | 10 2015 111 595 A1 | 1/2017 |
| DE | 10 2015 119 690 A1 | 5/2017 |
| DE | 10 2017 203 832 B3 | 5/2018 |
| DE | 10 2017 203 823 A1 | 9/2018 |
| EP | 0 296 838 A2 | 12/1988 |
| EP | 0 884 567 A1 | 12/1998 |
| EP | 2 963 440 A1 | 1/2016 |
| WO | WO 2017/080908 A1 | 5/2017 |

OTHER PUBLICATIONS

Office Action dated Mar. 24, 2021 in China Patent Application No. 201810985799.2; 6 pgs.

Office Action dated Jun. 28, 2021 in corresponding European Patent Application No. 17 188 0089.1 (5 pages).

Office Action dated Jun. 28, 2021 in corresponding European Patent Application No. 17 188 0089.1 (with English translation), 10 pgs.

* cited by examiner

WAVEGUIDE COUPLING FOR A FILL LEVEL RADAR

CROSS-REFERENCE TO RELATED APPLICATIONS

This application claims the benefit of the filing date of European Patent Application No. 17 188 089.1, filed on 28 Aug. 2017, the entire content of which is incorporated herein by reference.

FIELD

The invention relates to fill level measurement using fill level measuring devices which operate according to the transit time method.

In particular, the invention relates to a waveguide coupling for a fill level radar, to a high-frequency radar module for a fill level radar, and to a fill level radar comprising a high-frequency radar module of this kind.

BACKGROUND

In order to measure the fill level of a medium in a container, microwave signals can be emitted towards the surface and the signals reflected on said surface can be received by the measuring device.

The distance between the measuring device and the surface of the medium can be determined from the time between the transmission of the signals and the reception of the reflected signals (transit time) and from said distance the fill level can be determined using known variables of the measurement setup.

The measuring method is therefore also referred to as the transmit time or radar method.

The microwave signals can be generated and emitted continuously or in pulses.

Fill level measuring devices of this kind typically comprise a high-frequency chip, which generates and processes the microwave signals, and an antenna element, which emits the microwave signals.

The microwave signals to be emitted, also referred to in the following as high-frequency transmission signals, are transmitted to the antenna element via a HF signal line.

SUMMARY

An object is to provide an advantageous fill level radar which operates according to the transmit time method.

This object is achieved by the subject matter of the independent claims.

Developments are set out in the dependent claims and in the following description of embodiments.

A described embodiment relates to a waveguide coupling for a fill level radar, which coupling comprises a waveguide and a high-frequency chip, which is arranged at least in part in the waveguide and is used to generate a high-frequency transmission signal.

The high-frequency chip comprises a coupling element for coupling the transmission signal into the waveguide.

The coupling element may for example be a coupling pin in the form of a metal pin (through metallisation structure, e.g. line piece).

The coupling element may also be designed in the form of a fin or a patch antenna.

The chip comprising the coupling element is accommodated at least in part in the waveguide.

Bonding connections for connecting the high-frequency chip to the coupling element are not required.

In particular, it is not necessary for the generated high-frequency signal from the microwave chip to be transmitted to a printed circuit board before then being transmitted to an antenna element.

A direct bonding connection between the chip and the antenna element is also not required.

By integrating the coupling element into the high-frequency chip, signal paths can furthermore be shortened, such that the length of the feed line from the high-frequency chip to the coupling element entails as little insertion loss as possible, such that negative influences on the sensitivity of the radar system can be minimised.

Since the microwave signal is coupled directly from the HF chip into the waveguide (the coupling element is indeed a component of the high-frequency chip), unfavourable signal connections can be omitted.

According to an embodiment, the coupling element is arranged on the upper face of the high-frequency chip.

According to another embodiment, the coupling element is arranged on the lower face of the high-frequency chip.

Both embodiments have somewhat different advantages.

For example, in the latter case, the coupling element is mechanically better protected.

If the coupling element is accommodated on the upper face of the chip, the microwave signal can be emitted into the medium located thereabove in an unhindered manner.

No attenuation is caused by the chip material, for example.

Moreover, the coupling element is located in this case on the same chip face as the high-frequency circuit part of the chip.

It is therefore not necessary to implement complex connections within the chip.

According to another embodiment, the waveguide coupling comprises a substrate on which the high-frequency chip is mounted.

The substrate is moreover attached to the waveguide, which produces a very stable construction.

According to another embodiment, the waveguide comprises a resonator chamber or resonance chamber, which is formed by a cavity in the substrate.

Typically, the walls of the resonator chamber are metallised and the resonance chamber may be filled at least in part with a dielectric.

In particular, the dielectric may only be provided below the coupling element.

The coupling element may also be embedded in the dielectric.

According to another embodiment, the waveguide coupling comprises an antenna horn that is mounted on the end of the waveguide.

The high-frequency chip is, for example, adhesively bonded to the substrate.

Another embodiment relates to a high-frequency radar module for a fill level radar, which comprises a waveguide coupling as described above and in the following.

Another embodiment relates to a fill level radar comprising the high-frequency radar module as described above and in the following.

BRIEF DESCRIPTION OF THE DRAWINGS

Embodiments are described in the following with reference to the drawings.

Where the same reference numerals are used in the following description of the figures, they denote the same or similar elements.

Figure 1:
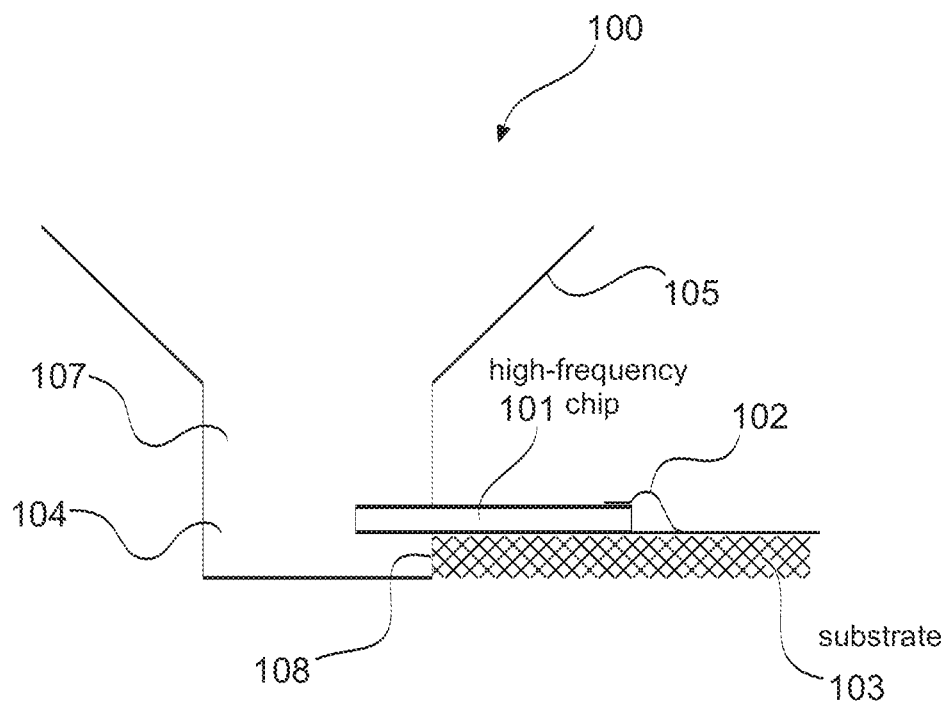

The views in the drawings are schematic and not to scale.

FIG. 1 shows a waveguide coupling according to one embodiment.

Figure 2:
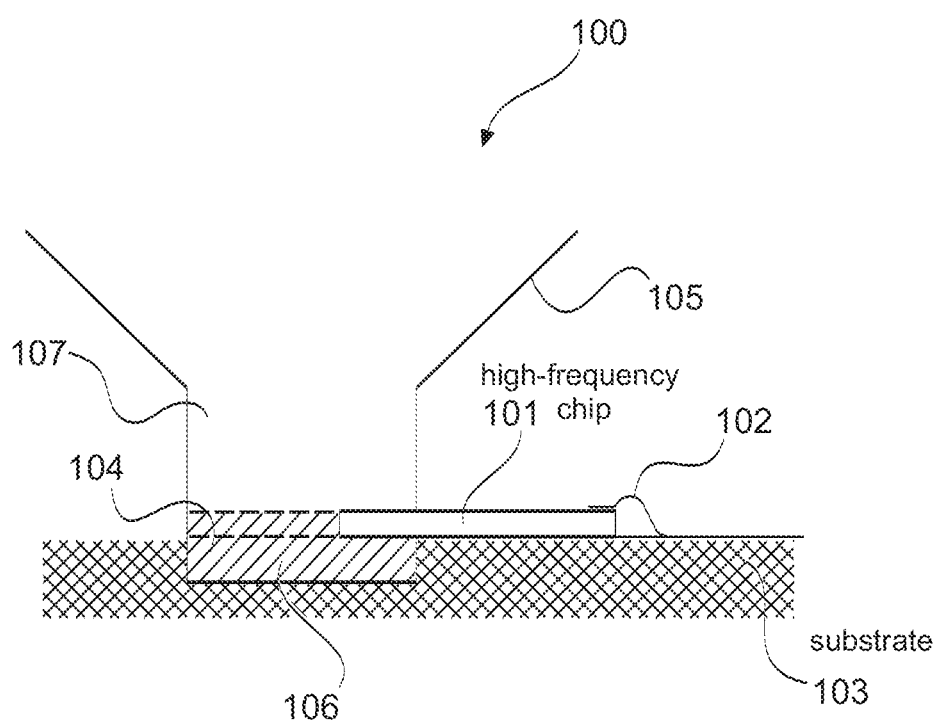

FIG. 2 shows a waveguide coupling according to another embodiment.

Figure 3:
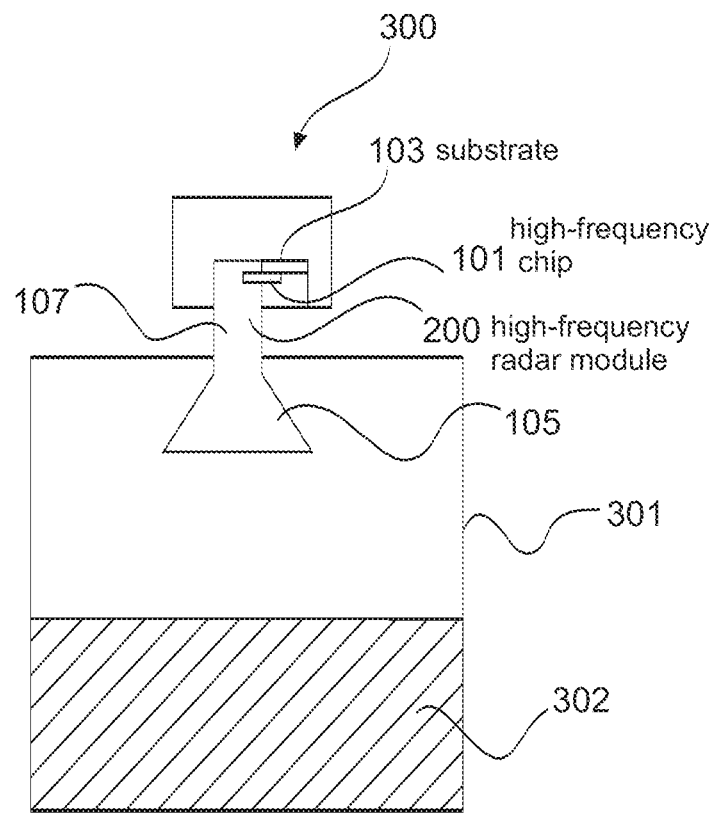

FIG. 3 shows a fill level measuring system according to one embodiment.

Figure 4:
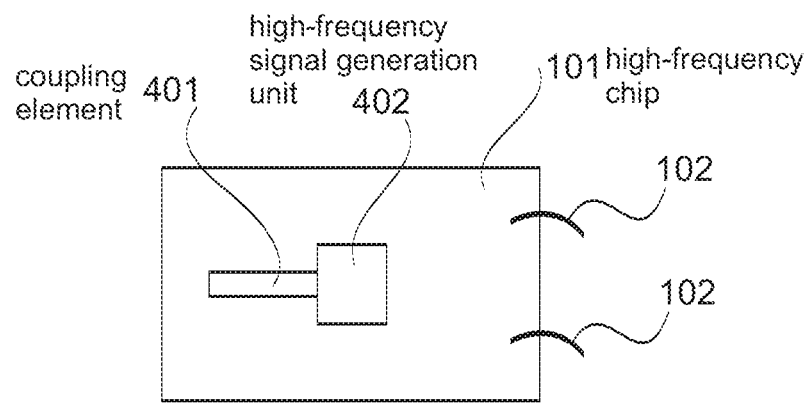

FIG. 4 shows a high-frequency chip comprising a coupling element according to one embodiment.

DETAILED DESCRIPTION OF EMBODIMENTS

FIG. 1 shows a waveguide coupling 100 for a fill level radar 200 (cf. FIG. 3).

The high-frequency chip 101 is arranged on a substrate 103, for example a printed circuit board, a ceramic support or a metal plate, and is connected to the power supply via bonding wires 102.

Control signals may also be transmitted via said bonding wires.

However, the bonding wires may not be used to transmit high-frequency microwave signals.

The high-frequency chip 101 projects at least in part into the resonator chamber or resonance chamber 104 of the waveguide 107.

The waveguide 107 is closed off on the underside thereof, such that it forms a resonance chamber 104.

The resonance chamber 104 is formed between the coupling element, which is located on the upper or lower face of the substrate 103, and the lower, closed end of the waveguide 107.

A horn antenna 105 is connected to the other end of the waveguide, via which horn antenna the HF transmission signal is emitted towards the filling material surface.

A lens for focusing signals may also be provided.

In the embodiment from FIG. 1, the resonance chamber 104 of the waveguide 107 is located next to the substrate 103, on which the high-frequency chip 101 is arranged.

The high-frequency chip 101 extends beyond the terminal edge 108 of the substrate 103 and projects into the waveguide 107.

The coupling element 401 by means of which the HF transmission signal is emitted is arranged on the upper face or lower face of the high-frequency chip (cf. FIG. 4).

The transmission signal reflected on the filling material surface may also be received via said coupling element.

The high-frequency transmission signal (microwave signal) is coupled directly from the chip via the coupling element 401 into the waveguide.

Omitting transmission of a HF signal from the microwave chip to another medium (for example a printed circuit board (PCB), remote fin, remote pin) results in improved signal transmission properties.

The "ringing", which is an effect in the vicinity of the antenna that can lead to imprecise distance measurements in the vicinity of the antenna, is greatly reduced by means of the direct and simplified coupling.

The sensitivity of the system is improved on account of the reduced insertion loss.

The assembly is also simplified, since the sophisticated HF signal transmission is possible without connection technology.

In contrast with an antenna-on-chip solution, the present arrangement has the advantage that the antenna can be offset above the waveguide 107, i.e. at a distance from the substrate.

In applications at high temperatures, the electronics can thus be placed further away from the antenna.

In other words, direct coupling of the microwave signal from the chip into the waveguide is provided, the coupling element itself being a component of the high-frequency chip and projecting at least in part into the waveguide.

A coupling pin 401 is implemented on the chip surface, as shown in FIG. 4.

The waveguide is arranged around and above said pin.

The chip is located at least in part, but possibly also completely, within the waveguide.

A small patch, i.e. a planar radiating element, may be used instead of a coupling pin.

The resonator chamber 104 below the chip may be unfilled, as shown in FIG. 1, or it may be filled with a dielectric 106, as shown in FIG. 2.

The coupling pin is usually a component of the layout of the chip on the upper face thereof.

Said pin may also be located on the lower face of the chip.

In this case, the layout of the chip and the later assembly are conceived correspondingly.

The resonator chamber itself may be integrated in the substrate 103, which is a printed circuit board or the like, as shown in FIG. 2.

In this case, the substrate 103 forms a cavity in which the waveguide 107 can be inserted.

The HF chip itself may be adhesively bonded to the substrate and electrically contacted with the power supply by means of bonding technology and so as to receive control signals.

Alternative contacting methods are possible, for example embedding the chip in a carrier material and establishing an electrical connection via a structured metallisation plane.

The chip is in this case completely embedded in a material (e.g. plastics material).

The surface is provided with a metallisation layer, in which the connection lines are located.

It is also possible to install a lens above the entire arrangement for the purpose of signal focusing.

The above-described feed-in method can also be used to excite other types of antenna.

The bonding wires 102 shown are used simply to supply the chip with power and other signals.

Said wires do not convey microwave signals.

FIG. 3 shows a measuring setup comprising a container 301 in which a filling material 302 is located.

A fill level measuring device 300 which comprises a high-frequency radar module 200 comprising the above-described waveguide coupling is mounted at the top of the container.

A dielectric lens 108 may be mounted on the end of the horn antenna 105.

In addition or as an alternative to the lens 108, a gas-tight process seal 109 may be provided inside the waveguide in order to insulate the chip from the container atmosphere.

FIG. 4 is a plan view of a high-frequency chip 101 comprising a high-frequency signal generation unit 402, to which a coupling element 401 is connected.

A high-frequency signal generation unit comprising a coupling element in the form of a pin (line piece) is shown.

Alternatively, a single patch or a patch array may be provided.

For the sake of completeness, it should be noted that "comprising" and "having" do not exclude the possibility of other elements or steps, and the indefinite articles "one" or "a" do not exclude the possibility of a plurality.

It should further be pointed out that features or steps described with reference to one of the above embodiments may also be used in combination with other features or steps of other above-described embodiments.

The invention claimed is:

1. A waveguide coupling for a fill level radar, comprising:
   a waveguide;
   a high-frequency chip, which is arranged at least in part in the waveguide, and configured to generate a high-frequency transmission signal; and
   a substrate on which the high-frequency chip is mounted, wherein the substrate is mounted on the waveguide,
   wherein the high-frequency chip includes a coupling element configured to couple the high-frequency chip with the waveguide by feeding the high-frequency transmission signal into the waveguide, and
   wherein the waveguide comprises a resonator chamber which is integrated in a cavity in the substrate.

2. The waveguide coupling according to claim 1, wherein the coupling element is designed as a coupling pin.

3. The waveguide coupling according to claim 1, wherein the coupling element is arranged on the an upper face of the high-frequency chip.

4. The waveguide coupling according to either of claim 1, wherein the coupling element is arranged on the lower face of the high-frequency chip.

5. The waveguide coupling according to claim 1, wherein the resonator chamber is filled with a dielectric at least up to a plane in which a bottom surface of the high-frequency chip is arranged.

6. The waveguide coupling according to claim 1, further comprising:
   an antenna horn that is mounted on an end of the waveguide.

7. The waveguide coupling according to claim 1, wherein the high-frequency chip is adhesively bonded to the substrate.

8. A high-frequency radar module for a fill level radar, comprising:
   a waveguide coupling for a fill level radar, including:
   a waveguide;
   a high-frequency chip, which is arranged at least in part in the waveguide, and configured to generate a high-frequency transmission signal; and
   a substrate, on which the high-frequency chip is mounted, wherein the substrate is mounted on the waveguide,
   wherein the high-frequency chip includes a coupling element configured to couple the high-frequency chip with the waveguide by feeding the high-frequency transmission signal into the waveguide, and
   wherein the waveguide comprises a resonator chamber which is integrated in a cavity in the substrate.

9. A fill level radar comprising:
   the high-frequency radar module according to claim 8.

* * * * *